United States Patent [19]

Cimenti

[11] Patent Number: 5,199,348

[45] Date of Patent: Apr. 6, 1993

[54] MACHINE FOR EXTRACTING JUICE FROM CITRUS FRUIT

[76] Inventor: Antonio Cimenti, Via Baron, 15-30027 San Dona'di Piave (Venezia), Italy

[21] Appl. No.: 789,340

[22] Filed: Nov. 8, 1991

[30] Foreign Application Priority Data

Nov. 8, 1990 [IT] Italy ................. 45769 A/90

[51] Int. Cl.$^5$ ................. A23N 1/02; A47J 19/02; B30B 9/02

[52] U.S. Cl. ................. 99/510; 99/495; 100/98 R; 100/125; 100/131

[58] Field of Search ................. 99/495, 509, 510, 513, 99/349; 100/98 R, 125, 131, 134, 135, 233, 264, 266, 218; 221/258, 251, 174, 168, 170

[56] References Cited

U.S. PATENT DOCUMENTS

| | | | |
|---|---|---|---|
| 1,575,704 | 3/1926 | Nayada | 100/131 |
| 2,667,118 | 1/1954 | Nelson | 99/495 |
| 3,086,455 | 4/1963 | Belk | 100/131 |
| 3,183,955 | 5/1965 | James | 99/495 |
| 4,088,070 | 5/1978 | Montagroni et al. | 99/509 |
| 4,154,163 | 5/1979 | Niemann | 99/495 |
| 4,309,944 | 1/1982 | Frost, Jr. et al. | 100/108 |
| 4,421,021 | 12/1983 | Holbrook | 99/509 |
| 4,917,007 | 4/1990 | Nelson | 100/98 R |
| 4,922,814 | 5/1990 | Anderson et al. | 99/510 |
| 4,924,770 | 5/1990 | Raub | 99/511 |

FOREIGN PATENT DOCUMENTS

| | | | |
|---|---|---|---|
| 0366881 | 5/1990 | European Pat. Off. | 99/495 |
| 2216784 | 10/1989 | United Kingdom | 99/495 |

Primary Examiner—Timothy F. Simone
Attorney, Agent, or Firm—Wenderoth, Lind & Ponack

[57] ABSTRACT

Machine for extracting juice from citrus fruit in which the fruit are squeezed between a fixed plate (41) and a movable plate (42) mutually convergent at their lower part. At the beginning of every operative cycle, the fruit (6) is introduced between the plates from their upper part. During the first half of the operating cycle, the movable plate (42) approaches the fixed plate (41) by the action of a crank (31-32-34) - connecting rod (35) unit controlled by a motor reducer (30). The approaching movement of the movable plate (42) causes the squeezing of the fruit (6). The squeezed juice falls into the hopper (22) and, then, into the container (8). Afterwards, the movable plate (42) goes away from the fixed plate (41) and the squeezing residual product (6A) comes off said plates (41,42), it falls on the inclined grill (23) and it slides from the grill into the drawer (26). The fruit (6) to squeeze is disposed into a loader (12) from which the fruit is, on every cycle, singly introduced between said plates (41-42) by the action of the spoon (513) controlled by the motor reducer (30) through suitable kinematic units.

11 Claims, 8 Drawing Sheets

MACHINE FOR EXTRACTING JUICE FROM CITRUS FRUIT

BACKGROUND OF THE INVENTION

The present invention relates to a machine for extracting juice from citrus fruit.

Various kinds of machines for extracting juice from citrus fruit are already known.

The known machines, in particular those automatically feeding the fruit, squeezing the same, collecting the extracted juice and discharging the residue, are generally complicated and of considerable overall size. Moreover, the cleaning of the various parts of the machines in contact with the fruit, with the liquid obtained by squeezing the fruit and with the residual products, is difficult and in some cases, the cleaning is possible only by carrying out a laborious disassembly of the various parts.

In general, the machine disclosed in Italian Patent Application n. 45784 A/89, filed on Oct. 19, 1989 by the present inventor, obviates fairly well the above-said drawbacks.

However, such a machine is also subject to the following restrictions and drawbacks.

In the first place, the loading device holds only a small quantity of fruit.

Further, the squeezing unit comprises two vertically extending plates mutually convergent at their lower parts. A first of these vertical plates is slidable longitudinally in a horizontal direction so as to be alternately movable toward and away from the second plate by a crank-connecting rod mechanism driven by an electric motor and speed reducer. The second plate is pivoted at its upper part and is urged by a spring in such a manner that its lower part is biased toward said first plate. This squeezing unit has a drawback in that the spring is a simple leaf spring which tends to lose its resiliency after a long working time.

Moreover, the first plate is guided by special guides that are expensive and that furthermore must be precisely assembled thereby giving rise to further manufacturing costs. Moreover, as verified, the guides form surfaces on which residual products that are difficult to clean accumulate.

Also the system for collecting both the liquid obtained by squeezing the fruit and the working residual products comprises separate elements that are disposed in such a way as to form zones that are difficult to access, especially a drawer for collecting the residual products. Consequently the cleaning of such parts is not easy and remains incomplete if it is not accurately carried out.

SUMMARY OF THE INVENTION

An object of the present invention is to obviate the above-described drawbacks by providing a machine for squeezing fruit which comprises means for loading the fruit in the form of central and lateral inclined chutes, feeding means in the form of a spoon for moving the fruit disposed in the central chute of said loading means into squeezing means, squeezing means in the form of a fixed plate and a pivoted movable plate for squeezing the fruit to produce juice therefrom, means for driving said feeding means and said squeezing means, means for collecting the juice of the squeezed fruit and means for collecting the residual products of the squeezed fruit.

BRIEF DESCRIPTION OF THE DRAWINGS

In order to better understand the features and advantages of the present invention, reference is hereinafter made in more detail to a preferred embodiment thereof, and to the accompanying drawings, wherein.

In such figures, like elements are designated with the same reference numerals.

DETAILED DESCRIPTION OF THE PREFERRED EMBODIMENT

Figure 1:
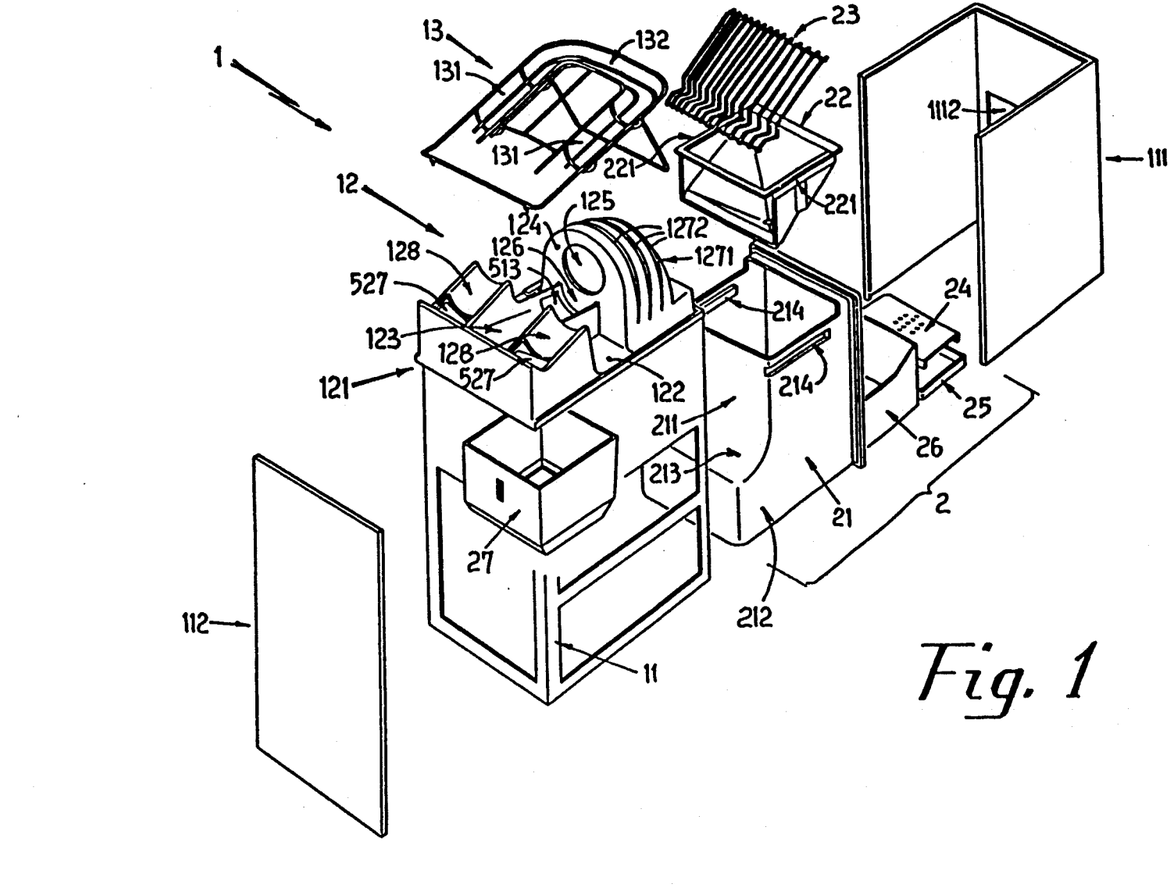
FIG. 1 is an exploded perspective view of a machine for extracting juice according to the present invention.
Figure 2:
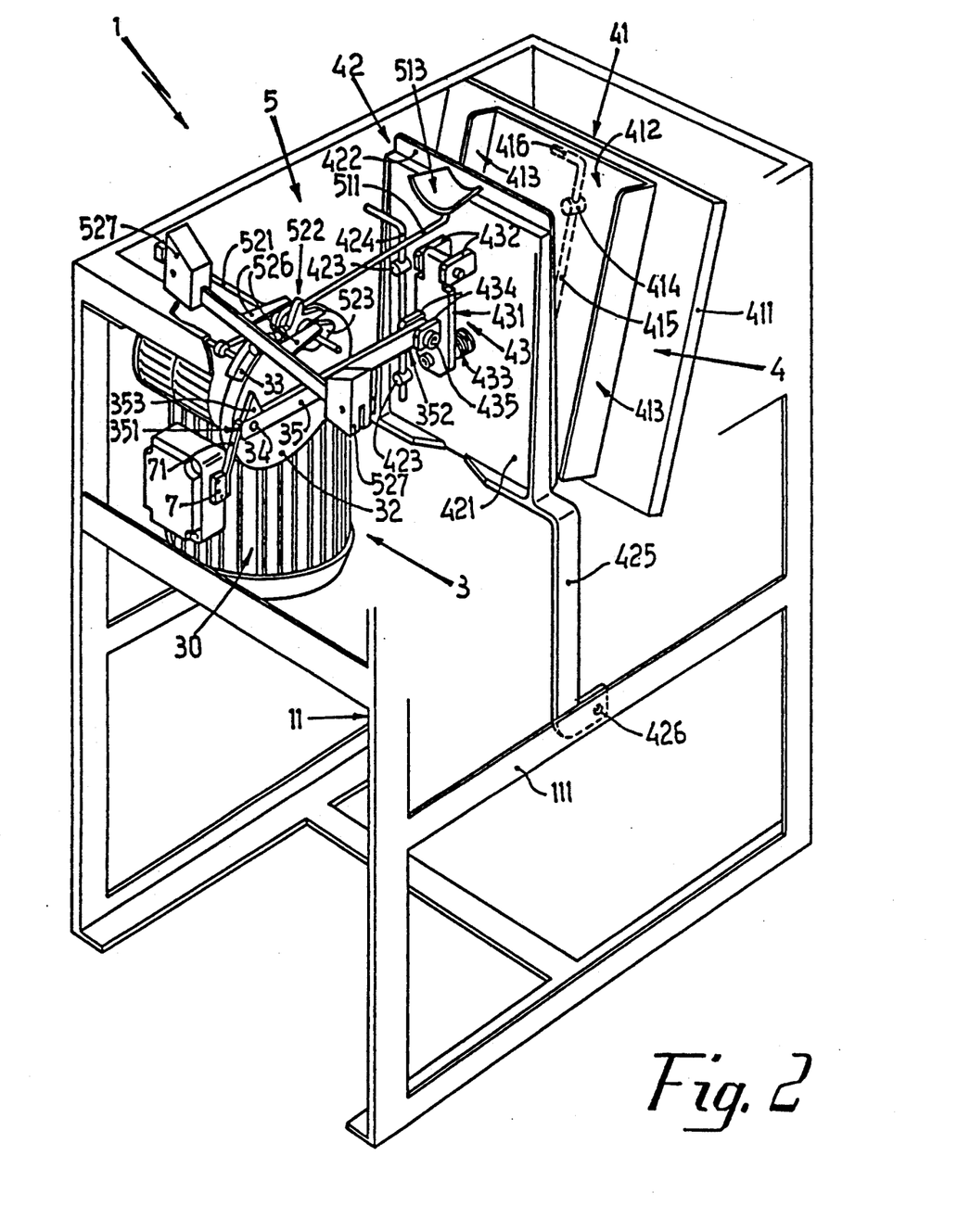
FIG. 2 is a perspective view, partly broken away, of the same machine, showing the details of fruit squeezing members and the associated driving means thereof.

With particular reference to FIGS. 1 and 2, the machine 1 of the present invention comprises a framework 11 covered by suitable panels 111-112, and on whose upper part is disposed a loader 12 on which a reticular structure 13 is placed.

A unit 2 for collecting the juice of the squeezed fruit and the residual products (6A) is adapted to be inserted into the framework through a suitable opening 1112 defined in the front wall of the panel 111.

The collecting unit 2 is in the form of a shaped case 21 that is insertable through said front opening 1112.

Referring to FIGS. 3-6, a hopper 22, a grill 23, a support shelf 24 which is insertable in a respective tank 25, and a drawer 26 are insertable into the shaped case 21 through its entirely open front side.

Moreover, a protective casing 27 is insertable through the opportunely uncovered upper part of the machine I as will be hereinafter described.

With particular reference to FIG. 2, the kinematic feeding unit 5 drives, during each every operative cycle of the machine, both the components for feeding the fruit in the loader 12 and the element for introducing the fruit to the squeezing station (4). Reference numeral 3 designates the driving unit 3 of both the kinematic feeding unit 5 and of the squeezing station 4.

The various components which form the kinematic feeding unit 5, the squeezing station 4 and the driving unit 3 as well as the other components shown in FIG. 1, will be described hereinafter in detail.

Figure 6:
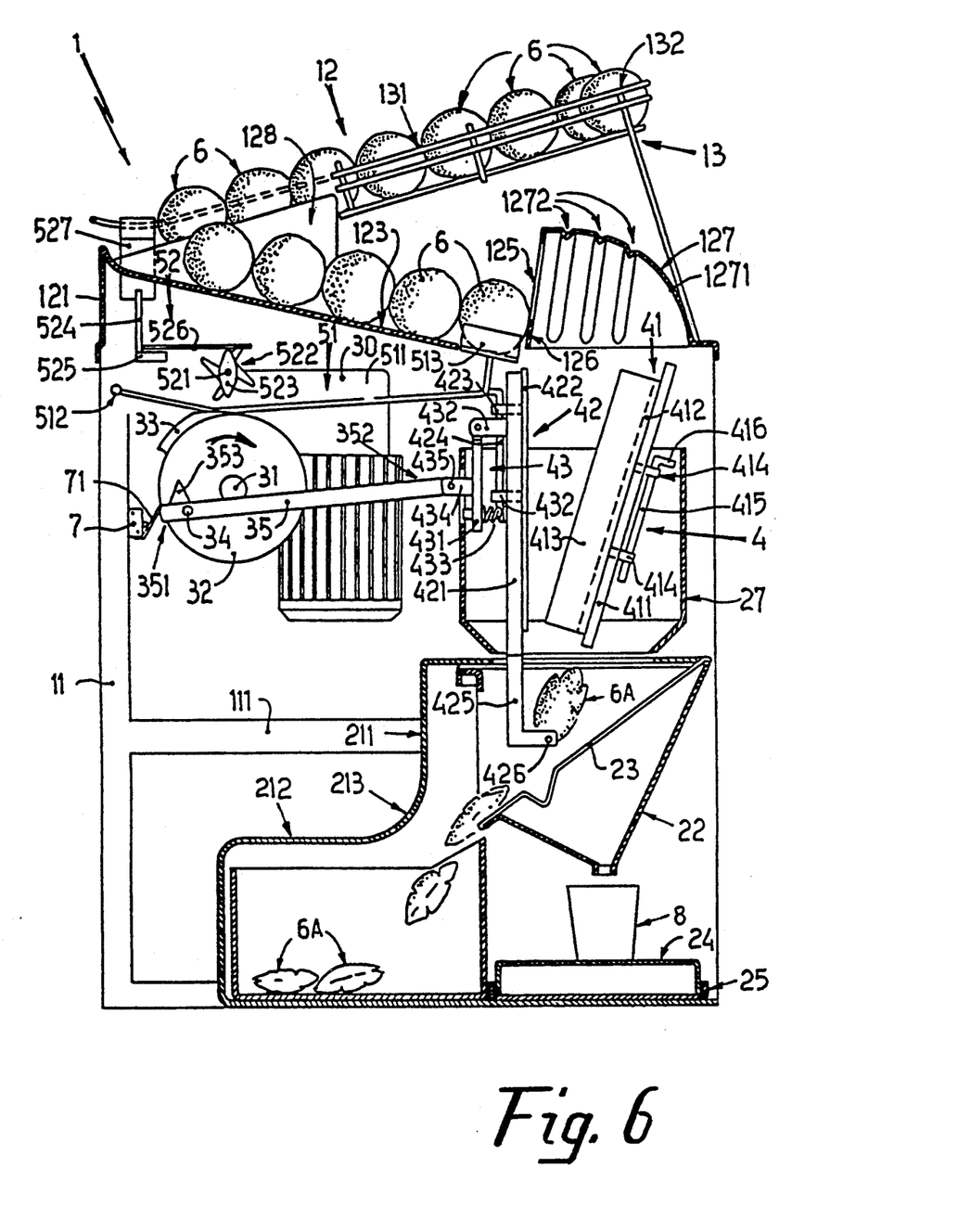

Referring to FIGS. 1 through and 6, the loader 12 is formed by a case 121 comprising a shelf 122 which is supported by the upper part of the framework 11 along the peripheral edge of the shelf 122.

At the central part of the shelf 122 is a central inclined chute 123 formed by a concave channel extending longitudinally downwards from a rear end of the shelf 121 to slightly past a midway point of the shelf 121.

In the front end of the central inclined chute 123 is defined an opening accommodating a spoon 513 having a function described hereinafter.

Moreover, the front end of the chute 123 terminates at a vertical wall 124 defining a hole 125 in the center thereof. A lowermost peripheral portion of the hole 25 is located above the front edge of the central inclined chute 123 so as to provide a step 126. Moreover, the vertical wall 124 defines the posterior part of a cowling 127 that includes a covering 1271 that is transversely convex and thus forms an arcuate part connecting the vertical wall 124 with the front end of the shelf 122.

The cowling 127, as clearly shown in FIGS. 3 through 6, is disposed over the squeezing station 4 and is provided with transverse ribs 1272 whose function will be described later.

Two additional inclined chutes 128 are formed at the rear part of the shelf 122 and are disposed to each side of the central inclined chute 123, symmetrically and parallel thereto. These lateral inclined chutes 128 extend for a length equal to about half that of the central inclined chute 123, and converge at rear ends thereof with the rear end of the central inclined chute 123.

The rear ends of both of said lateral inclined chutes 128 define respective openings accommodating corresponding respective components for lifting the fruit 527. The shape and function of these components will be hereinafter described.

As stated above, the reticular structure 13 is supported on, and removably connected to, the case 121. The reticular structure 13 comprises metallic rods which form two lateral structures 131 defining two concave channels. The channels each form extensions of said lateral inclined chutes 128, respectively, and are connected, at their rear ends, by an arcuate channel 132 which is disposed, as particularly shown in FIG. 1, at the front-upper part of the machine 1.

As already stated, FIG. 2 shows the kinematic feeding unit 5, the squeezing station 4 and the driving unit 3.

Therefore, referring to FIG. 2, as well as to FIGS. 3 through 6, the driving unit 3 is formed by an electric motor-reducer 3 on whose shaft 31 is fitted a disk 32.

The circumferential edge of the disk 32 is provided with a projecting part forming a cam 33 whose function will be hereinafter described.

A pin 34 projects from the outer side of the disk 32. The pin 34 is engaged by the first end 351 of a connecting rod 35, whose second end 352, on the other hand, engages a stud 435 that is connected to the movable plate 42 of the squeezing station 4.

Moreover, the first end 351 of the connecting rod 35 is provided with a tooth 353 that is directed upwards, and whose function will be also hereinafter described.

The squeezing station 4 is constituted by a fixed support plate 41 fitted on the framework 11, and by a movable plate 42 pivoted, at the lower part, about a transverse axis disposed in a plane coincident with the inner surface of the fixed plate 41.

More specifically, the fixed plate includes a fixed support plate 411 having a rectangular shape and laterally fitted on said framework 11.

A cover plate 412 is fitted on the inner side of the fixed support plate 411, that is the side directed towards the adjacent movable plate 42. The cover plate 412 is formed of a metallic sheet, preferably stainless steel, whose sides 413 extend orthogonally to said movable plate 42.

The cover plate 412 is connected with said support plate 411 by means of two pegs 414 which extend through corresponding holes in said fixed support plate 411 and of a metallic stem 415 that is inserted through suitable holes in the free ends of the pegs 414 which protrude from the cover plate 412 at the outer side of said support plate 411.

The upper end of the metallic stem 415 is bent to form a short orthogonal part 416 which allows the stem to be gripped by the user and either inserted into or extracted from the pegs 414. The short part 416 also prevents the stem 415 from falling downwards through the pegs 414.

The movable plate 42 is, in turn, constituted by a movable support plate 421 also having a rectangular shape, and whose outer surface (the surface opposite the said fixed plate 41) is covered with a cover plate 422.

The cover plate 422 has a corresponding rectangular shape and is formed, like the above-described cover plate 412, by a suitable metallic sheet, preferably of stainless steel.

The cover plate 422 is removably connected with the respective movable support plate 421 by means of two pegs 423 which extend through corresponding holes defined in said movable support plate 421 and by means of a metallic stem 424 that is identical to the metallic stem 415.

Two side arms 425 extend downwards from the lower end of said movable support plate 421, and respective pins 426 extend from free ends of the arms 125 into corresponding holes made through the side members 111 of the framework 11.

As particularly shown in FIGS. 3 through 6, the movable plate 42 is pivoted along a transverse axis delimited by the intersection of the planes coincident with the inner surfaces of the plates 41-42, such axis being moreover obviously disposed below the lower edge of the movable plate 42.

Further, the movable plate 42 extends precisely vertically both in its rest position before beginning the squeezing cycle and at the end of such cycle, whereas the fixed plate 41 is inclined with respect to said movable plate 42, whereby the plates are mutually convergent downwards.

Figure 4:
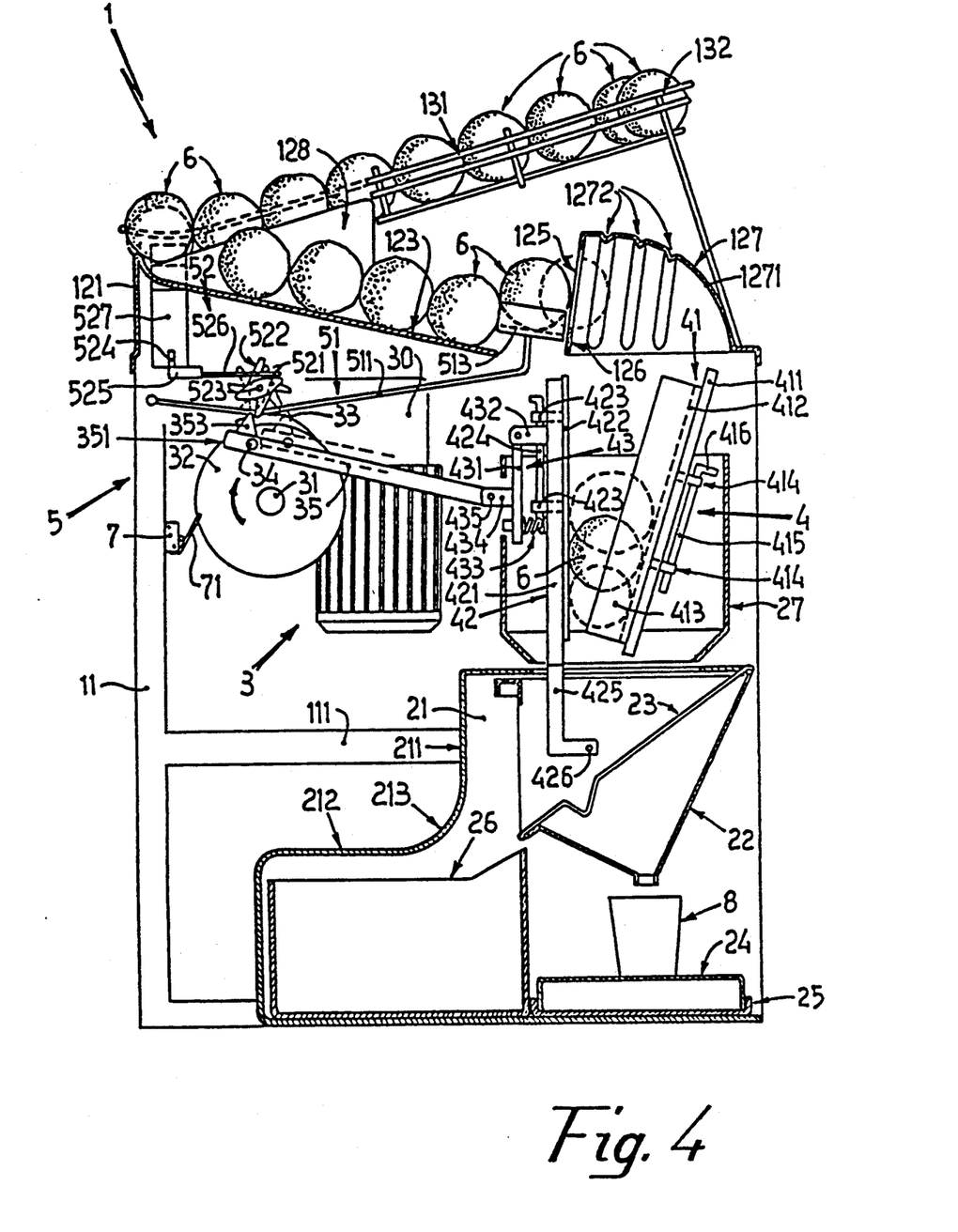

In such positions, the distance between the lower parts of said fixed 41 and movable 42 plates is quite shorter than the one between their upper parts. This makes it possible to squeeze fruit having very different dimensions between the plates, contrary to known machines which can squeeze only fruit having very limited overall size differences. In order to illustrate this point, FIG. 4 shows in dashed lines the largest and the smallest size of fruit which can be squeezed.

In practice, the largest dimension of the fruit that can be squeezed is about 85 mm and the smallest is about 55 mm.

A connecting unit 43 linked to the connecting rod 35 is disposed on the rear side of the movable support plate 421. The unit 43 consists of a small plate 431 having its upper end pivoted on lugs 432 extending from the rear side of the movable support plate 421 and its lower end in engagement with a spring 433 interposed between the small plate 431 and the rear side of the movable support plate 421.

Moreover, a fork 434 is formed between the two ends of the small plate 431, and the second end 352 of the connecting rod 35 is connected with the fork 434 by means of a stud 435.

The connecting unit 43 reduces the movement of the movable plate 42 by the rod 35, particularly when the plate is in its maximum advanced position against the fixed plate 41 (see FIG. 5) thereby preventing the plate from reaching a dead center position and an undesirable locking of the machine under the forces used for squeezing the fruit.

With particular reference to the FIGS. 3 through 6, all of the components forming the squeezing station 4 are self-contained in the protective casing 27.

The protective casing 27 has a substantially parallelepipedal shape and both retains the liquid particles which squirt out from the plates (41-42) during the squeezing of the fruit and conveys the particles towards the underlying hopper 22.

The lower parts of the four side walls of the protective casing 27 are inclined inwardly in the downwards direction.

When the protective casing 27 is in place, such parts thus converge inwards toward the underlying hopper 22.

The rear wall of the protective casing 27 is provided with a suitable opening enabling the connecting rod 35 to pass therethrough.

The protective casing 27 is easily inserted around the squeezing station 4 by first detaching the connecting rod 35 from the movable plate 42.

The removal of the protective casing 27 can be likewise easily carried out in a similar operation.

Above the driving unit 3 is the kinematic feeding unit 5 which will be described in detail hereinafter.

A first part 51 of the kinematic feeding unit 5 comprises the following elements.

A bar 511 is supported at its intermediate portion on the disk 32 and is pivoted at its rear portion by a hinge 512 on the framework 11. The front part of the bar 511 is connected to a concave plate disposed within the opening formed in the front end of the central inclined chute 123.

The concave plate conforms to the shape of the central inclined chute 123 thereby forming the spoon 513 having the function hereinafter described.

Figure 7:
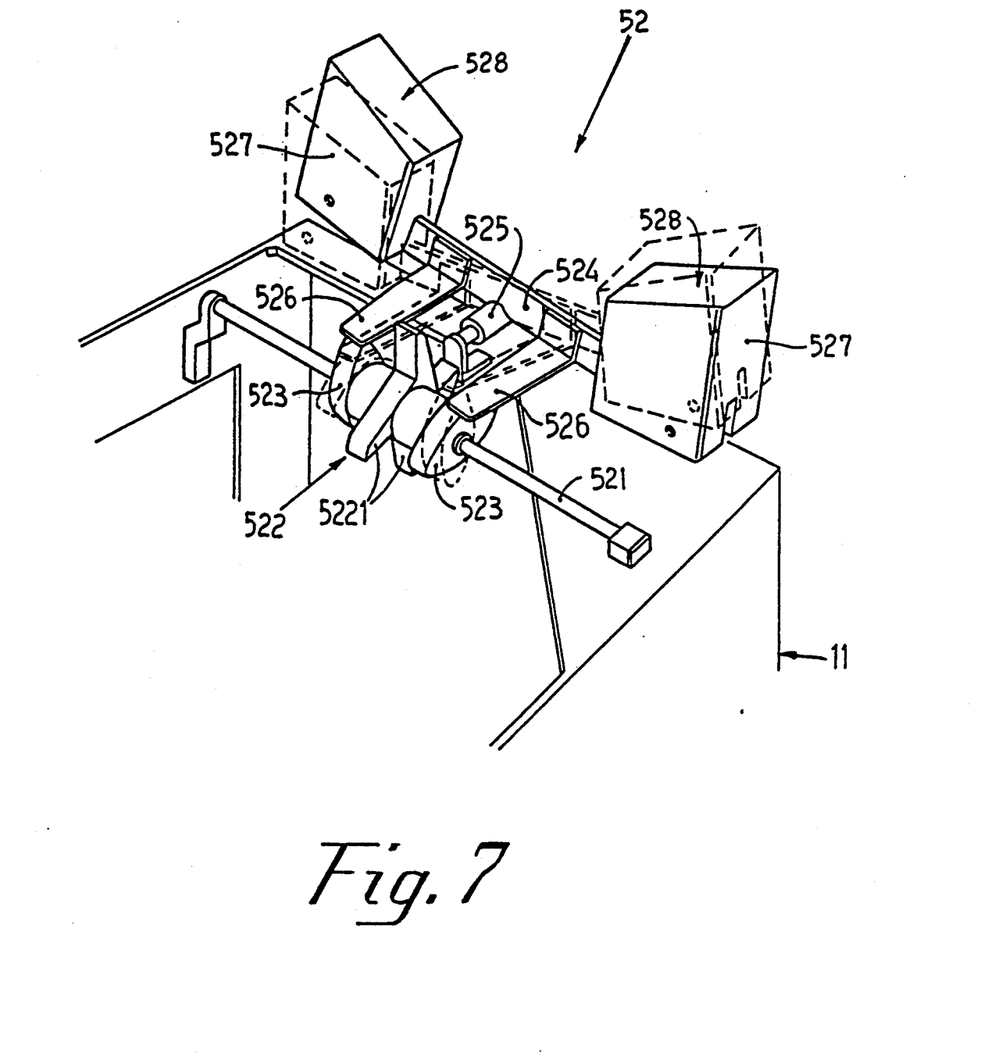
FIG. 7 is a perspective view of a part of the feeding mechanism of the machine.
Figure 8:
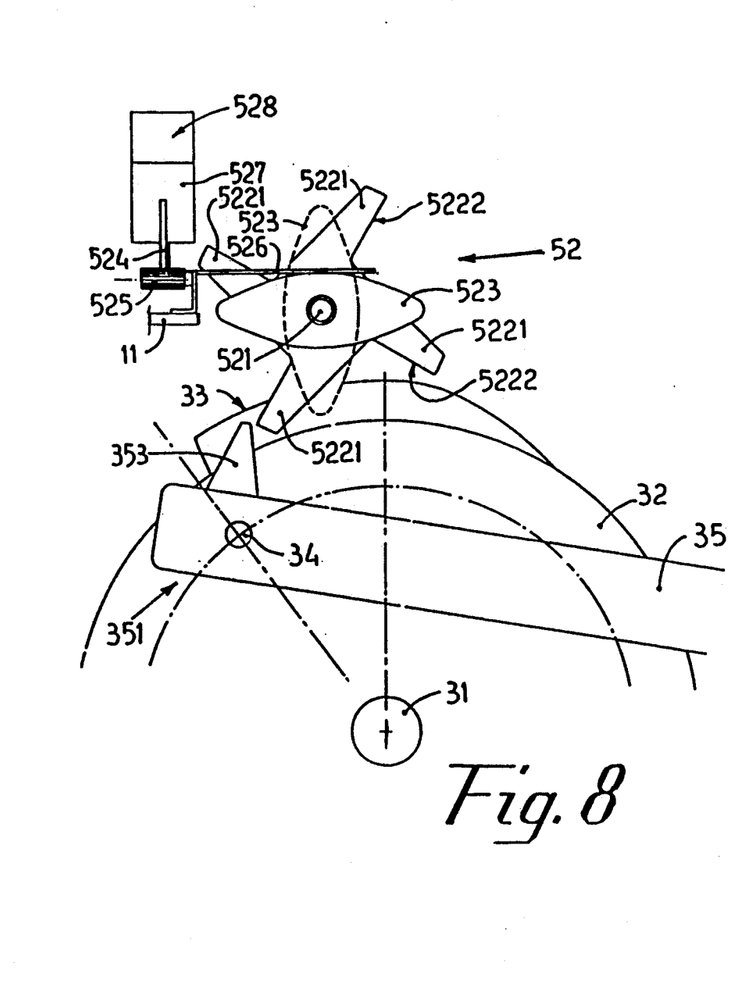
FIGS. 8 and 9 are schematics of the same part of the feeding mechanism shown in FIG. 7.
Figure 9:
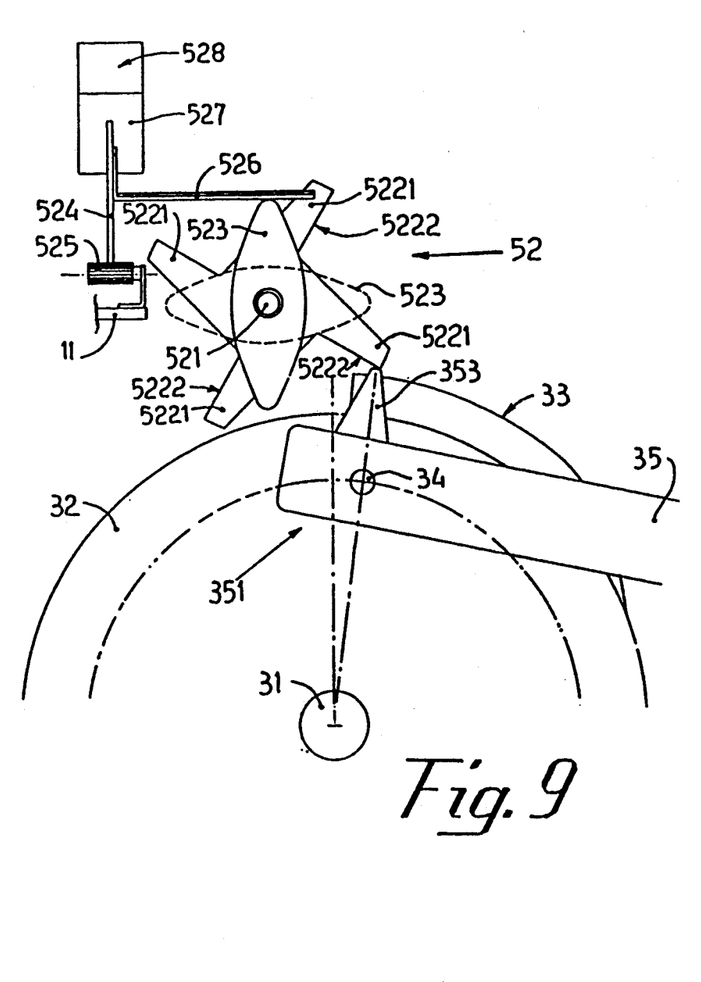

A second part 52 of the kinematic feeding unit 5 is always disposed above the driving unit as particularly shown in FIGS. 7, 8, and 9.

With particular reference to FIG. 7, the second part 52 of the kinematic feeding unit 3 includes a transverse axle 521 supported on lateral parts of the framework 11. A sprocket-wheel 522 is disposed on the central part of the transverse axle 521 exactly above the connecting rod 35. With particular reference to FIGS. 8 and 9, the sprocket-wheel 522 comprises four arms radially protruding from its central part and effectively forming four corresponding teeth 5221. Such teeth 5221 define side surfaces 5222 extending radially with respect to the rotation axle 521, and orthogonally to each other.

The tooth 353 formed on the first end 351 of the connecting rod 35 will engage the teeth 5221 in order to drive the second part 52. Two substantially elliptical cams 523 are disposed on the transverse axis 521 to both sides of the sprocket-wheel 522 as symmetrically spaced therefrom, with the major axes thereof oriented orthogonally to one another.

A transverse rod 524 is disposed behind said transverse axis 521 and parallel thereto.

The transverse rod 524 is pivoted, at its central part, on a bearing 525 mounted to the framework 11 and is provided with two longitudinal tongues 526 that extend symmetrically to another with respect to the bearing 525 and have free ends engaging the cams 523.

Moreover, two lifting components 527 are disposed on the free ends of the transverse rod 524, symmetrically to each other with respect to said bearing 525, and define respective upper surfaces 528 inclined downwards in a convergent and symmetrical way. As mentioned above, the lifting components 527 are associated with respective openings through the rear ends (i.e. lowermost ends) of the lateral inclined chutes 128.

Hereinafter the components of the unit 2 for collecting the juice of the squeezed fruit and the working residual products (6A) will be described.

With reference to the FIG. 1 and FIGS. 3 through 6 the collecting unit 2 includes a case 21 having a substantially parallelepipedal shape. A rear protuberance 212, also having a substantially parallelepipedal shape, extends from the lower part of the rear wall 211 of the case 21 and has an arcuate upper part 213.

Moreover, the case 21 has an entirely open front side in order to allow the hereinafter described components (22,23,24,25,26) of said collecting unit 2 to be inserted therein and withdrawn therefrom. The upper part of the case 21 also is open in order to enable the case to receive the squeezed juice from the overlying squeezing station 4.

Moreover, two longitudinal grooves, forming respective longitudinal guides 214, are defined in the side walls of the case 21 near the upper ends thereof, respectively. A drawer 26, having a substantially parallelepipedal shape, is inserted into the case 21 as far as a position within the corresponding rear protuberance 212 where it partially protrudes towards the front part to such an extent as to receive the residual products (6A) as hereinafter described.

The tank 25 and the support shelf 24 placed therein are then inserted into the case 21.

Finally, a hopper 22 is inserted into the case 21 through its front opening, with its side edges 221 slid along said longitudinal guides 214 until its inlet opening is located at a position corresponding to the upper opening of the case 21.

A grill 23 is previously provided on the upper inlet opening of the hopper 22.

It is to be noted that all the corners of the various components (21,22,23,24,25,26) of said collecting unit 2 are rounded as to facilitate a complete cleaning of them.

Moreover, all such components are easily insertable into the case 21 and the case is in turn easily insertable into machine 1 through the front opening 1112.

Therefore, their removal and assembly are as easy and simple as ever.

Lastly, such elements do not present surfaces which accumulate dirt and which are difficult to reach.

The operation of the machine 1 will be hereinafter described with particular reference to FIGS. 3 through 6.

Figure 3:
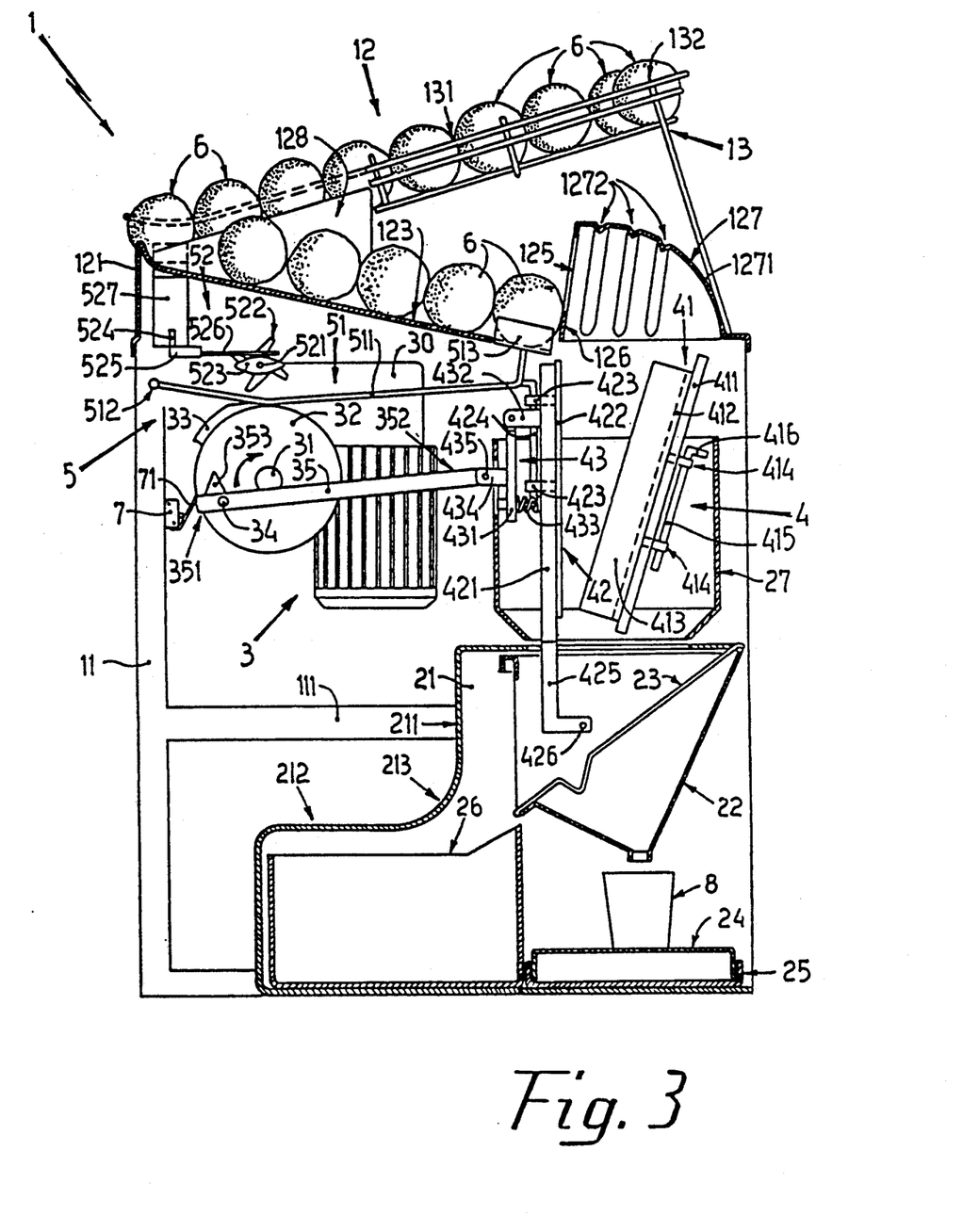
FIGS. 3, 4, 5 and 6 are side views, partially in section, of the machine showing in sequence the main steps of an operative cycle of the machine.

Before starting the machine 1, the fruit 6 (citrus fruit) to be squeezed is obviously disposed either on the central inclined chute 123 or the lateral chutes 128 and channels 131-132.

It is to be noted that the particular shape of the fruit loading device of the present invention is very advantageous because it enables a larger quantity of fruit to be loaded than was possible in the previous machines.

As can be clearly seen from FIG. 3, showing the machine 1 in its rest position and ready to begin a squeezing cycle, the pin 34 is positioned a little bit before the rear dead center position of the driving unit 3 with respect tot he direction of rotation of the disk 32, as indicated by the arrow thereon. The cam 33, with its front inclined part surface forming a ramp, supports the bar 511.

At this point, the user presses a control push-button (not shown in the figures) preferably disposed on the front part of the machine which starts the electric motor and speed reducer 30 that in turn rotates the disk 32.

Consequently, the cam 33 pushes the bar 511 upwardly so that the spoon 513, disposed at the free end thereof, moves the fruit 6, that it supports, upwardly until the fruit moves forwards along the inclined surface of the spoon 513, and passes over the step 126 and through the hole 125. Then, as can be seen in FIG. 4, the fruit falls between the plates 41 and 42 of the squeezing station 4.

Because the plates 41 and 42 are mutually convergent in the downwards direction, the distance between their lower parts is shorter that the diameter of the fruit 6, and thus the fruit stops between the plates 41 and 42 in a position clearly shown in FIG. 4.

In the meantime, the tooth 353, projecting from the first end 351 of the connecting rod 35, approaches a corresponding tooth 5221 of the sprocket-wheel 522 as shown in FIG. 8.

While this movement is going on, the tooth 353 engages the side surface 5222 of such tooth 5221, hooks it and pushes it so progressively forwards as to cause the respective sprocket wheel 522 to rotate to the position shown in FIG. 9, wherein the sprocket-wheel 522 and tooth 353 having been rotated through a quarter of a revolution release the tooth 5221.

Consequently, the cams 523 also are rotated through a quarter of a revolution. Therefore, a tongue 526 supported by one of the cams 523 is pushed upwards, whereas the other tongue 526 is lowered on the corresponding cam 523.

Consequently, as is clearly shown in FIG. 7, the transverse rod 524 rotates about the central pin of the bearing 525 thereby raising one lifting component 527 and lowering of the other lifting component 527.

In FIG. 7 the above-described starting position is indicated by continuous lines whereas the final position is indicated by dashed lines.

It follows that the raising of one of the lifting components 527 causes the lifting of the fruit 6 supported thereon. Because the upper surface 528 of the lifting component 527 is inclined, the fruit 6 will slide to the upper end of the central inclined chute 123 and will occupy the place set free by the previous introduction to the squeezing station 4 of the fruit 6 positioned at the lower end of the central inclined chute 123.

It is obvious that this operation will be alternately repeated for each cycle, so that the central inclined chute 127 will be continuously fed with fruit from both the lateral inclined chutes 128. The rotation of the disk 32 also effects the rotation of a crank defined between the center of the disk 32 and the pin 34 fitted thereon. Rotation of the crank pushes the movable plate 42 forward by means of the connecting rod 35.

The movable plate 42 rotates about the respective pins 426. It approaches the opposite fixed plate 41 thus causing the progressive squeezing of the fruit 6 disposed therebetween.

This movement will continue until the pin 34 reaches a position corresponding to the front dead center position.

Figure 5:
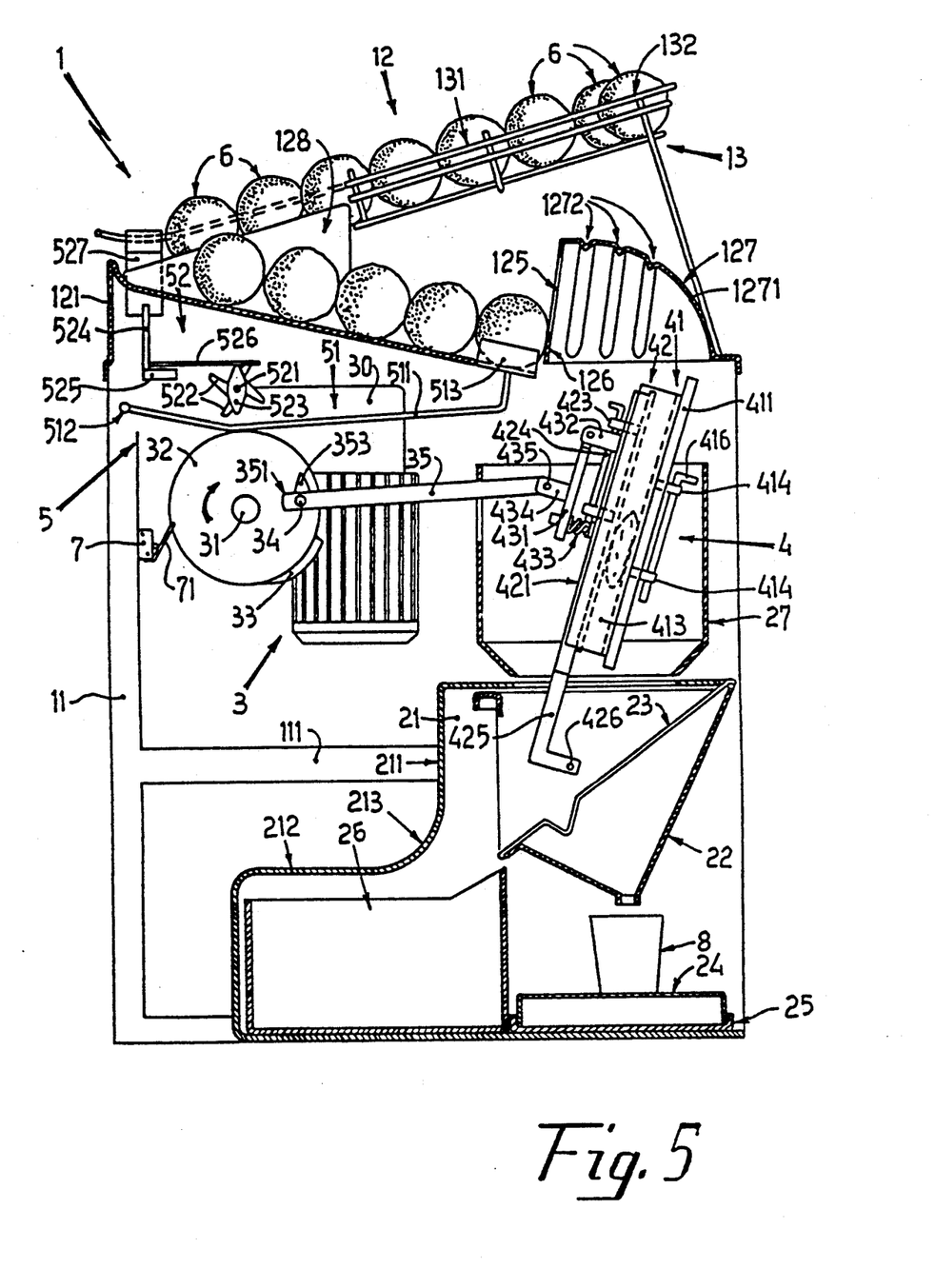

In such position, as is shown in FIG. 5, the movable plate 42 is parallel to the opposite fixed plate 41 but it remains separated from the fixed plate 41 by a space of some millimeters that is equivalent to the thickness of the peel of the squeezed fruit.

The progressive squeezing of the fruit 6 causes the fruit to first explode and consequently its peel breaks.

The opening of the fruit allows its juice to come out and fall into the underlying hopper 22 through the openings of the grill.

Then, the juice will flow from the hopper 22 to the container 8 (a drinking glass or alike) where it is collected.

During the explosion and the subsequent squeezing of the fruit 6, the juice is sprayed all about the same. The juice sprayed sideways impinges the sides 413 of the cover plate 412 disposed on the fixed plate 41.

The sides retain the juice and convey it into the underlying part.

The juice sprayed upwards impinges the inner side of the cowling 127, whose ribs 1272 also collect and convey the juice downwardly.

In the end, more of the juice squirting from the fruit is not intercepted by sides 413, but meets the protective casing which directed the juice downwardly.

When the squeezing is completed, the rotation of the disk 32 continues and the movable plate 42 pivots about the pins 426 moving from the fixed plate 41.

As soon as the space between both plates reaches a sufficient value, the residue of the squeezed fruit 6 (that is the peel together with the pips and the remaining part of the pulp), falls from between said plates 41 and 42 onto the grill 23 and, owing to the inclination of the grill, slides downwards therealong and falls into the drawer 26.

During this last step, the disk 32 will continue rotating until the pin 34 is positioned a little bit before the rear dead center position and said first end 351 (rear end) of the connecting rod 35 meets the control lever 71 of a microswitch 7 thus cutting off the electrical power supply to the electrical motor and speed reducer 30 and stopping the machine 1 in a position wherein it is ready to begin another operating cycle.

Obviously, the machine 1 can be controlled to perform only one cycle or several successive cycles and, consequently, to perform the squeezing of a single piece of fruit or of a lot of fruit.

Moreover, the machine can be provided with a container for collecting and accumulating the juice obtained by the squeezing of a plurality of pieces of fruit during a series of successive cycles.

Such container will be obviously provided with a suitable drawing means and moreover it can be provided also with cooling and/or mixing devices for cooling and/or stirring the liquid contained therein.

All of the above-mentioned means are of a per se known kind.

From the description above, it should be evident that the following features and the advantages are provided by the machine of the present invention:

a compactness enabling the machine to be placed directly on a table or other support economical owing to its considerable structural simplicity with consequent reduced costs of production considerable operative safety and high reliability high speed in carrying out an operative cycle facilitates, in a very simple way, a complete and accurate cleaning of the parts in contact with the fruit to be squeezed, with the residue of the fruit and with the juice obtained by squeezing the fruit, thus consequently enabling maximum hygiene squeezing of the fruit very effectively to obtain very good juices that are, in any case, equivalent to those which can be obtained by using the already known machines accommodating a very wide dimensional range of fruit, that is fruit having dimensions (diameters) that are considerably different.

It is well understood that modifications and variations may be made to the machine of the present invention without departing however from the scope of the following claims.

I claim:

1. A machine for extracting juice from fruit, said machine comprising:

a framework, a squeezing station including a first plate fixed relative to said framework, and a second movable plate pivotably mounted at a lower part thereof to said framework about a transverse axis, said second plate confronting said first plate and pivotable about said axis between a rest position and a squeezing position, said plates converging toward one another in a downward direction in the machine when said second plate is in the rest position thereof, and said plates lying close to one another when said second plate is in said squeezing position;

a loader including a central inclined chute having an uppermost end and a lowermost end which is disposed at a level above said squeezing station, lateral inclined chutes having lowermost ends adjacent the uppermost end of said central inclined chute, lifting components at the lowermost ends of said lateral inclined chutes, respectively, said lifting components each movable between a first position and a raised position, each said lifting component directing a piece of fruit having been situated at the lowermost end of a respective said lateral inclined chute into the central inclined chute when in the raised position thereof, and a spoon at the lowermost end of said central inclined chute, said spoon being movable between a first position and a raised position, said spoon directing a piece of fruit having been situated at the lowermost end of said central inclined chute toward a space between the plates of said squeezing station when in the raised position thereof;

a kinematic unit operatively connected to the lifting components and the spoon of said loader and to the movable plate of said squeezing station, said kinematic unit being drivable to move said lifting components and said spoon between said first and said raised positions thereof, respectively, and to pivot said movable plate about said transverse axis between said rest and said squeezing positions thereof;

drive means operatively connected to said kinematic unit for driving said kinematic unit; and a collecting unit disposed below said squeezing station so as to receive and collect juice and residue of fruit squeezed at said squeezing station.

2. A machine for extracting juice from fruit as claimed in claim 1, wherein said loader comprises a support shelf mounted on said framework at an upper part of said machine, said shelf defining both a central concave surface therein constituting said central inclined chute with the uppermost end of said central inclined chute being defined at a rear end of said shelf, and concave surfaces extending therein alongside, parallel and symmetrically to said central concave surface, respectively, said concave surfaces constituting said lateral inclined chutes, respectively, an arcuate channel interconnecting uppermost ends of said lateral inclined chutes, a vertical wall at the lowermost end of said central inclined chute and disposed over said squeezing station, said vertical wall having a hole therethrough spaced above a bottom of the concave surface constituting said central inclined chute at the lowermost end thereof such that said vertical wall provides a step between said central inclined chute and said hole, and a cowling extending from said vertical wall over said squeezing station.

3. A machine for extracting juice from fruit as claimed in claim 2, wherein said spoon is located at the level of said hole in the vertical wall when in the raised position thereof so as to direct a piece of fruit having been situated at the lowermost end of said central inclined chute through said hole.

4. A machine for extracting juice from fruit as claimed in claim 1, wherein the transverse axis about which said movable plate is pivotably mounted lies within a plane coincident with said fixed plate, and said plates are disposed parallel to one another when said movable plate is in the squeezing position thereof.

5. A machine for extracting juice from fruit as claimed in claim 1, wherein said kinematic unit includes a crank connected to said drive means so as to be rotated thereby, and a connecting rod connected to said crank and said movable plate.

6. A machine for extracting juice from fruit as claimed in claim 2, wherein the transverse axis about which said movaeable plate is pivotably mounted lies within a plane coincident with said fixed plate, and said plates are disposed parallel to one another when said movable plate is in the squeezing position thereof.

7. A machine for extracting juice from fruit as claimed in claim 6, wherein said kinematic unit includes a crank connected to said drive means so as to be rotated thereby, and a connecting rod connected to said crank and said movable plate.

8. A machine for extracting juice from fruit as claimed in claim 1, wherein said drive means is an electric motor having a speed reducer.

9. A machine for extracting juice from fruit as claimed in claim 1, wherein said collecting unit includes a hopper disposed under said squeezing station, a grill covering said hopper and inclined relative to the horizontal so as to direct residue of fruit having fallen from said squeezing station therealong to the side of said hopper while allowing juice dripping from said squeezing station to pass therethrough into said hopper, a drawer disposed to the side of said hopper so as to collect residue of fruit sliding along and directed to the side of said hopper by said grill, and a case in which said hopper said grill and said drawer are disposed and removably mounted thereto, and further comprising a panel mounted over said framework, said panel having an opening therethrough which allows said case to be inserted to and withdrawn from a position beneath said squeezing station in the machine.

10. A machine for extracting juice from fruit as claimed in claim 9, wherein said collecting unit also includes a support shelf disposed in a tank removably positioned beneath said hopper in said case, whereby a container for collecting juice flowing from said hopper can be supported by said shelf below said hopper.

11. A machine for extracting juice from fruit as claimed in claim 9, wherein said hopper, said drawer and said case all have rounded corners facilitating the cleaning thereof.

* * * * *